April 21, 1964 M. F. STANLEY ETAL 3,129,673
APPARATUS FOR PRODUCING VARIEGATED ICE CREAM
Filed March 14, 1962
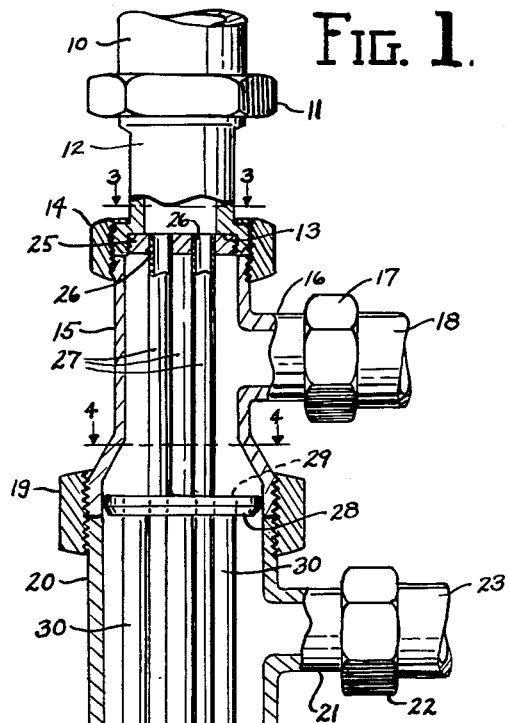
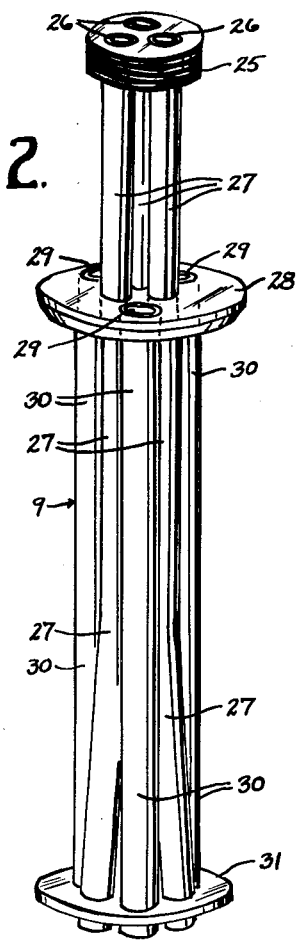
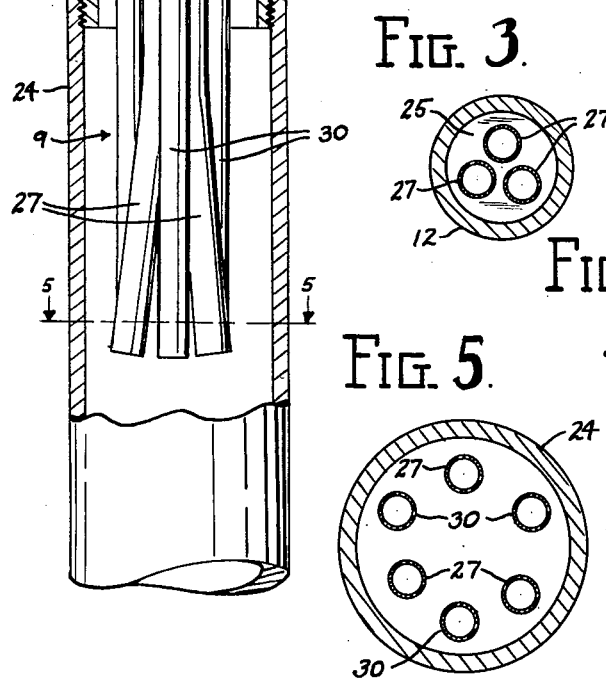
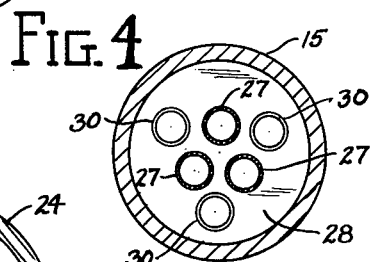
INVENTORS
MORRIS F. STANLEY
MORRIS W. STANLEY
BY
Morsell + Morsell
ATTORNEYS.

United States Patent Office 3,129,673
Patented Apr. 21, 1964

3,129,673
APPARATUS FOR PRODUCING VARIEGATED
ICE CREAM
Morris F. Stanley, Oconomow, and Morris W. Stanley, Milwaukee, Wis., assignors to Ho-Maid Products Co., Milwaukee, Wis., a corporation of Wisconsin
Filed Mar. 14, 1962, Ser. No. 179,558
4 Claims. (Cl. 107—1)

This invention relates to an improved apparatus for producing variegated ice cream, and more particularly to a novel, double-variegating device which is designed to simultaneously introduce two different flavoring materials into the ice cream.

Heretofore, variegating devices have been designed to automatically mix a single edible flavoring syrup or sauce into ice cream to produce a so-called "ripple" design or pattern. Recently, however, there has been a trend toward including more than one such flavoring syrup in the ice cream, as for example wild cherry and fudge to produce so-called "Cherry-Chocolate Twist" ice cream, and such prior variegating devices are incapable of performing this operation. With this in mind, the principal object of the present invention is to provide a novel variegating apparatus whereby two different flavoring materials can be simultaneously introduced into the ice cream, and which operation is performed in an efficient, economical, and sanitary manner.

A more specific object of the invention is to provide a variegating device having two sets of spaced, stationary syrup conducting tubes arranged within an ice cream delivery line in such a manner that contrasting flavoring syrups can be automatically introduced into the moving mass of ice cream to produce alternate streams of said flavoring materials which extend uniformly throughout the ice cream.

A further object of the invention is to provide a nozzle-type variegating device wherein there are no moving or power-driven parts, thus minimizing manufacturing and installation costs, and promoting economy and efficiency of operation.

A further object of the invention is to provide a novel, double-flavor variegator as described, which device can be easily installed in conventional ice cream production systems, and which does not require any special, expensive production equipment.

Still further objects of the present invention are to provide an improved ice cream variegating apparatus which is durable and long-lasting, and which is reliable in operation.

With the above and other objects in view, which other objects and advantages will become apparent in the following detailed description, the invention consists of the improved apparatus for producing variegated ice cream and all of its parts and combinations as set forth in the claims, and any and all changes or modifications therein which shall come within the spirit of the invention and within the scope of said claims.

In the accompanying drawing, wherein the same reference numerals designate the same parts in all of the views:

FIG. 1 is a side elevational view of the improved variegator mounted in an ice cream line, parts of said variegator being broken away and shown in longitudinal section;

FIG. 2 is a perspective view of the syrup-distributor unit;

FIG. 3 is a transverse sectional view through the assembled apparatus, taken along line 3—3 of FIG. 1;

FIG. 4 is a transverse sectional view taken along line 4—4 of FIG. 1; and

FIG. 5 is another transverse sectional view through the apparatus, taken along line 5—5 of FIG. 1.

Referring now more particularly to FIG. 1 of the drawing, the numeral 10 designates a conduit or line which leads from a hopper (not shown) containing a first edible, flavoring material, such as chocolate, caramel, etc., and suitable pump and valve means are provided in said line for forcibly moving said flavoring syrup therethrough at a predetermined rate. Axially connected to said line 10 is a threaded adapter or reducer 12 which is detachably coupled to the end of said line by a union nut 11. The lower end of said reducer is threaded both externally and internally, and adjacent the lower end thereof is an internal annular shoulder 13, the purpose of which will be hereinafter seen.

Coupled to the lower end of the reducer 12, by means of a nut 14, is a first tubular, T-shaped fitting 15. In the illustrated embodiment of the present invention said T fitting 15 has an enlarged, externally-threaded lower end portion, and a lateral branch 16 to which a second syrup line 18 is detachably coupled. Said line 18 leads from a second source of flavoring syrup and also includes suitable pump means and flow control valves, such as are well known in the art.

Axially connected to the lower end of said T fitting 15, by means of a nut 19, is a second, larger T-shaped fitting 20. Said fitting 20 has a lateral branch 21 which is coupled, by means of a union nut 22, to an ice cream inlet conduit or line 23. The latter line leads from a continuous ice cream freezer and includes means for continuously directing ice cream in a semi-solid state therethrough and into said second T fitting. Threaded to and depending from the lower end of said second T fitting 20 is a discharge conduit 24 which is designed to discharge the ice cream into suitable containers or cartons therebelow.

With respect to the several fittings and connecting members illustrated and hereinabove described, said members are standard sanitary fittings, being formed of stainless steel or the like, but it is to be understood that the exact design of said members, as well as the illustrated coupling arrangement, is not an essential element of the present invention. It is contemplated, for example, that in place of the illustrated coupling arrangement between the T fittings 15 and 20, and between the latter T fitting and the discharge conduit 24, threaded adapters similar to the adapter 12 could be employed. Alternatively, said members could all be designed to interfit in sleeved relation, similar to the coupling arrangement between the fitting 20 and the discharge conduit 24. In short, several different coupling arrangements have been shown merely by way of example, and it is to be understood that any suitable coupling means could be employed without departing from the spirit of the invention. Similarly, the relative diameters of the syrup and ice cream inlet conduits can be varied, depending upon the particular pumping capacities or production requirements of the institution installing the present apparatus, and the invention is not to be limited in this respect either.

The novel syrup distributor unit characterizing the present invention is designated generally by the numeral 9 in the drawing. Said unit includes a cylindrical, externally-threaded top member 25 which has three transverse bores 26 therethrough which are arranged in a close, triangular pattern, and into which three elongated depending tubes 27 are pressed or otherwise secured, the upper ends of said tubes being flush with the top surface of said member 25. In the illustrated form of the invention said top member 25 is threaded into the lower end of the reducer 12 until it abuts the aforementioned internal annular shoulder 13 therein.

Mounted on and surrounding said tubes 27 at a point above their longitudinal midpoint and adjacent the lower end of the first T fitting 15, is a disc 28 which is substantially larger in diameter than said cylindrical top member 25. Said disc 28 is sealingly wedgingly fitted within the lower end of said first T fitting, or within the upper end of the fitting 20 therebelow, and in the preferred form of the invention said disc is soldered in place to ensure a tight seal and to eliminate the possibility of the same inadvertently shifting within said fittings. In some installations it may be preferable to employ a threaded reducer as the connecting member between said first and second T fittings, as hereinabove mentioned, and in such instances said disc 28 can be similarly fitted and sealed within said reducer.

As best appears in FIGS. 2 and 4, the tubes 27 project through said disc 28, and formed in and through said disc radially outwardly of said tubes are three triangularly-arranged, spaced orifices 29 into which three depending tubes 30 are secured, the upper ends of said tubes being flush with the top surface of said disc member.

The two sets of tubes 27 and 30 depend a substantial distance below the disc 28 and, intermediate their lengths the inner tubes 27 are bent or deflected outwardly, relative to their longitudinal axes, so that their lower or discharge ends are in circumferential alignment with the ends of the tubes 30 (FIG. 5). Thus, it will be seen that while the two sets of tubes 27 and 30 are initially arranged in a close, superposed triangular pattern within the disc 28 (FIG. 4), the deflection of said inner tubes 27 to form a circular discharge pattern provides substantial spacing between the lower ends of said tubes. This is an important element of the invention, as will be seen in the operational description of the present apparatus. In bending said tubes 27 outwardly, as described, it is desirable to employ a template 31 (FIG. 4) having corresponding apertures properly located therein to ensure the proper positioning and spacing of said tubes. When the syrup-distributor unit 9 is installed in the conduit assembly, however, said template is removed.

In the operation of the novel double-variegating device comprising the present invention, and after the syrup-distributor unit 9 has been installed in the assembly as described, one type of edible flavoring material, such as fudge syrup, is pumped through the line 10 into the upper end of the first T fitting 15, said syrup passing into and moving downwardly in the three depending tubes 27. Simultaneously, a second flavoring material, such as cherry syrup, is pumped through the line 18 into the main chamber of said T fitting 15, and is directed through the disc orifices 29 into the outer tubes 30. As said two flavoring materials move downwardly through the tubes 27 and 30, ice cream in a semi-solid state is simultaneously pumped through the pipe line 23 into the main chamber of the second T fitting 20. As said ice cream mass descends it moves between and completely around said spaced tubes 27 and 30, and when it reaches the discharge end of said tubes the flavoring syrups are continuously injected into the interior of said moving ice cream mass in the form of spaced alternate ribbons or streams of the two flavors. The variegated ice cream column continues downwardly through the conduit 24 and is discharged into a suitable container or carton therebelow.

From the foregoing it will be seen that the present invention not only provides a variegating device whereby two edible flavoring syrups or the like can be simultaneously introduced into ice cream, but whereby said flavoring materials are uniformly distributed therein in alternate streams or portions, which is highly desirable. Further advantages of the present variegating device are that it can be easily disassembled for cleaning, it can be readily installed in conventional ice cream production systems, it is simple and reliable in operation, and the complete elimination of moving parts therein not only promotes its economical and efficient operation, but minimizes its manufacturing cost. Moreover, in the use of the double-variegating device comprising the present invention, and as hereinabove mentioned, it is possible to vary the relative speeds and volume of the flavoring materials, and the ice cream, to obtain products containing varying selected amounts of flavoring syrups therein.

It is to be understood, of course, that while the present apparatus has been described herein in conjunction with the introduction of different flavoring syrups into ice cream, and this is its principal intended use, the invention is not limited in this respect. It is contemplated, for example, that the device could also be advantageously utilized to combine several different colored ice creams, or it could be effectively used to combine comestibles other than ice cream. Moreover, and as hereinabove emphasized, it is intended that the novel double-variegating device comprising the present invention include not only the structural embodiment thereof illustrated and described herein, but any and all changes or modifications therein which may come within the spirit of the invention and within the scope of the following claims.

What we claim is:

1. An apparatus for producing a comestible having two flavoring materials therein in continuous ribbon-like form, comprising: an elongated conduit having a lower discharge end; a first set of elongated deflectable tubes having upper and lower ends and extending longitudinally within said conduit toward the discharge end thereof, said tubes being adapted to carry moving streams of a first edible flavoring material directed into the upper portion of said conduit; a transverse conduit sealing member on and surrounding said tubes below their upper ends; and a second set of elongated deflectable tubes opening in and extending longitudinally from said sealing member toward the discharge end of said conduit, said second tubes being adapted to carry moving streams of a second edible flavoring material directed into said conduit between the upper ends of said first tubes and said sealing member; some of said elongated tubes being deflected from their longitudinal axes to provide uniformly-spaced alternate first and second flavoring tubes, whereby the first and second flavoring materials emitted from the lower ends of said tubes will be spaced uniformly and alternately in ribbon-like form in a comestible directed into and through said conduit below said sealing member.

2. An apparatus for producing a comestible having two flavoring materials therein in continuous ribbon-like form, comprising: an elongated conduit having a discharge end; a first flavoring supply pipe line communicating with said conduit; a second flavoring supply pipe line communicating with said conduit between said first supply pipe and the conduit discharge end; a first transverse sealing member mounted within said conduit between said supply pipes, said sealing member having a plurality of apertures therethrough; a first set of elongated deflectable tubes communicating with said sealing member apertures and extending longitudinally within said conduit toward the discharge end thereof, said tubes being adapted to carry moving streams of a first edible flavoring material introduced into said conduit through said first supply pipe; a second transverse sealing member mounted within said conduit between said second supply pipe and said conduit discharge end, said first tubes extending through said second sealing member; and a second set of elongated deflectable tubes opening in and extending longitudinally from said second sealing member toward said conduit discharge end, said second tubes being adapted to carry moving streams of a second edible flavoring material introduced into said conduit through said second supply pipe, some of said elongated tubes being deflected from their longitudinal axes to provide uniformly circumferentially alternately spaced first and second flavoring tubes; and a comestible supply pipe line communicating with said conduit between said second flavoring supply pipe and said conduit discharge end, whereby a semi-solid comestible entering said conduit through said comestible supply pipe and traveling toward said discharge end will surround and encase said elongated tubes, and whereby the first and second flavoring materials emitted from said tubes will be spaced uniformly and alternately in said comestible column in continuous ribbon-like form.

3. An apparatus for producing ice cream containing portions of two contrasting flavoring syrups, comprising: a syrup supply pipe; a first T fitting having a main chamber coupled to said pipe, and having a lateral branch opening therein; a second syrup supply pipe coupled to the lateral branch of said T fitting; a second T fitting having a main chamber coupled to said first T fitting main chamber and having a lateral branch opening therein; an ice cream supply pipe coupled to the lateral branch of said second T fitting; a disc member sealingly engaged in said first T fitting main chamber between the lateral branch thereon and said first syrup supply pipe, said disc member having a set of elongaed tubes extending therefrom and adapted to carry moving streams of edible flavoring syrup introduced into said first T fitting through said first syrup supply pipe; a second disc mounted on and surrounding said tubes intermediate their lengths and sealingly engaged in the main chamber of one of said T fittings between the lateral branches thereon, said second disc having a second set of elongated tubes extending therefrom and adapted to carry moving streams of flavoring syrup introduced through said second syrup supply pipe, whereby ice cream moving through said ice cream supply pipe and into and through said second T fitting will have said flavoring syrups introduced therein in continuous streams.

4. An apparatus for producing ice cream containing portions of two contrasting flavoring syrups, comprising: a syrup supply pipe; a first T fitting having a main chamber coupled to said pipe, and having a lateral branch opening therein; a second syrup supply pipe coupled to the lateral branch of said T fitting; a second T fitting having a main chamber coupled to said first T fitting main chamber and having a lateral branch opening therein; an ice cream supply pipe coupled to the lateral branch of said second T fitting; a disc member sealingly engaged in said first T fitting main chamber between the lateral branch thereon and said first syrup supply pipe, said disc member having a set of elongated deflectable tubes extending therefrom and adapted to carry moving streams of edible flavoring syrup introduced into said first T fitting through said first syrup supply pipe; a second disc mounted on and surrounding said tubes intermediate their lengths and sealingly engaged in the main chamber of one of said T fittings between the lateral branches thereon, said second disc having a second set of elongated deflectable tubes extending therefrom and adapted to carry moving streams of flavoring syrup introduced through said second syrup supply pipe, said tubes being deflected from their longitudinal axes to provide uniformly-spaced first and second flavoring tubes, whereby ice cream moving through said ice cream supply pipe and into and through said second T fitting will have said first and second flavoring syrups introduced therein in uniformly-spaced and alternate streams.

References Cited in the file of this patent
UNITED STATES PATENTS

| | | |
|---|---|---|
| 1,949,772 | Allen | Mar. 6, 1934 |
| 2,646,757 | Hackman | July 28, 1953 |